United States Patent
Uemura

(10) Patent No.: US 11,481,606 B2
(45) Date of Patent: Oct. 25, 2022

(54) METHOD OF UPDATING PARAMETERS AND INFORMATION PROCESSING APPARATUS

(71) Applicant: FUJITSU LIMITED, Kawasaki (JP)

(72) Inventor: Kento Uemura, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 403 days.

(21) Appl. No.: 16/840,635

(22) Filed: Apr. 6, 2020

(65) Prior Publication Data
US 2020/0334517 A1  Oct. 22, 2020

(30) Foreign Application Priority Data
Apr. 17, 2019 (JP) .............................. JP2019-078861

(51) Int. Cl.
  *G06N 3/04* (2006.01)
  *G06N 3/08* (2006.01)

(52) U.S. Cl.
  CPC .............. *G06N 3/0454* (2013.01); *G06N 3/08* (2013.01)

(58) Field of Classification Search
  CPC .............................. G06N 3/0454; G06N 3/08
  See application file for complete search history.

(56) References Cited

U.S. PATENT DOCUMENTS

| | | | |
|---|---|---|---|
| 11,109,083 B2* | 8/2021 | Saini | G06N 3/0454 |
| 2015/0106306 A1* | 4/2015 | Birdwell | G06N 3/0635 706/11 |
| 2017/0255721 A1* | 9/2017 | Kowatari | G06F 30/00 |
| 2020/0250511 A1* | 8/2020 | Hu | G06N 3/0427 |
| 2022/0091275 A1* | 3/2022 | Held | G06N 3/126 |

OTHER PUBLICATIONS

Kun Zhang et al., "Distinguishing Causes from Effects using Nonlinear Acyclic Causal Models", JMLR Workshop and Conference Proceedings vol. 6, pp. 157-164, Dec. 12, 2008.

* cited by examiner

*Primary Examiner* — David Bilodeau
(74) *Attorney, Agent, or Firm* — Staas & Halsey LLP

(57) ABSTRACT

A non-transitory computer-readable recording medium has stored therein a program that causes a computer to execute a process, the process including: obtaining an estimation value of a third variable by subtracting a second output value of a second parametric model to which a second variable is input from a first output value of a first parametric model to which a first variable is input; performing first parameter update of updating first parameters of the first parametric model and second parameters of the second parametric model such that independence between the second variable and the estimation value of the third variable is maximized; and updating the first parameters and third parameters of a third parametric model in the first parameter update, such that a third output value of the third parametric model is approximated to the first variable, the third parametric model being input with the first output value.

9 Claims, 6 Drawing Sheets

METHOD OF UPDATING PARAMETERS AND INFORMATION PROCESSING APPARATUS

CROSS-REFERENCE TO RELATED APPLICATION

This application is based upon and claims the benefit of priority of the prior Japanese Patent Application No. 2019-78861, filed on Apr. 17, 2019, the entire contents of which are incorporated herein by reference.

FIELD

The embodiments discussed herein are related to a method of updating parameters and an information processing apparatus.

BACKGROUND

In the field of data analysis, data mining, and so on, a relationship between pieces of data is clarified to make a decision or the like based on the thus-clarified relationship. For example, the relationship between pieces of data used in the decision-making in the fields of manufacturing, medical, material, and the like is not a point relationship (prediction) but a line relationship (cause and effect). In one example, in order to decrease a certain numerical value in a test, an item having a causality with the numerical value in the test is discovered to figure out which treatment is better. In another example, in order to produce a substance having a certain target strength, a part of the molecular structure having a causality with the strength is discovered to figure out which part of the molecular structure has to be changed and how much.

In the field of causal discovery for finding out whether there is causality between pieces of data, usually a model (function) that is theoretically verified as having a capability of determining the causality is used since the pieces of data used in the discovery do not have the causality every time. A post-nonlinear (PNL) model has been known as the above-described model. The PNL model is a model with a high representation ability among models that are theoretically verified. Model estimation by the theoretically verified PNL model makes it possible to discover a causal explanation of whether the target pieces of data have causality.

Related techniques are disclosed in, for example, Kun Zhang and Aapo Hyvarinen, "Distinguishing Causes from Effects using Nonlinear Acyclic Causal Models", JMLR Workshop and Conference Proceedings 6:157-164, 2007.

SUMMARY

According to an aspect of the embodiments, a non-transitory computer-readable recording medium has stored therein a program that causes a computer to execute a process, the process including: obtaining an estimation value of a third variable by subtracting a second output value of a second parametric model to which a second variable is assigned as an input variable from a first output value of a first parametric model to which a first variable is assigned as an input variable; performing first parameter update of updating first parameters of the first parametric model and second parameters of the second parametric model such that independence between the second variable and the estimation value of the third variable is maximized; and performing second parameter update of updating the first parameters and third parameters of a third parametric model in the first parameter update, such that a third output value of the third parametric model is approximated to the first variable, the third parametric model being assigned with the first output value as an input variable.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The theoretical verification of the PNL model is on the premise that there is infinite data, and thus the function to be used for the PNL model has to be properly selected to determine whether there is causality based on finite data in an actual case. However, since whether the function is proper is not assured in a common function discovery method, the PNL model to which the discovered function is applied may be unable to precisely determine the causality between the pieces of data in some cases.

Hereinafter, embodiments are described in detail with reference to the drawings. The embodiments do not limit the present disclosure. The embodiments may be combined with each other as appropriate without contradiction.

First Embodiment

Figure 1:
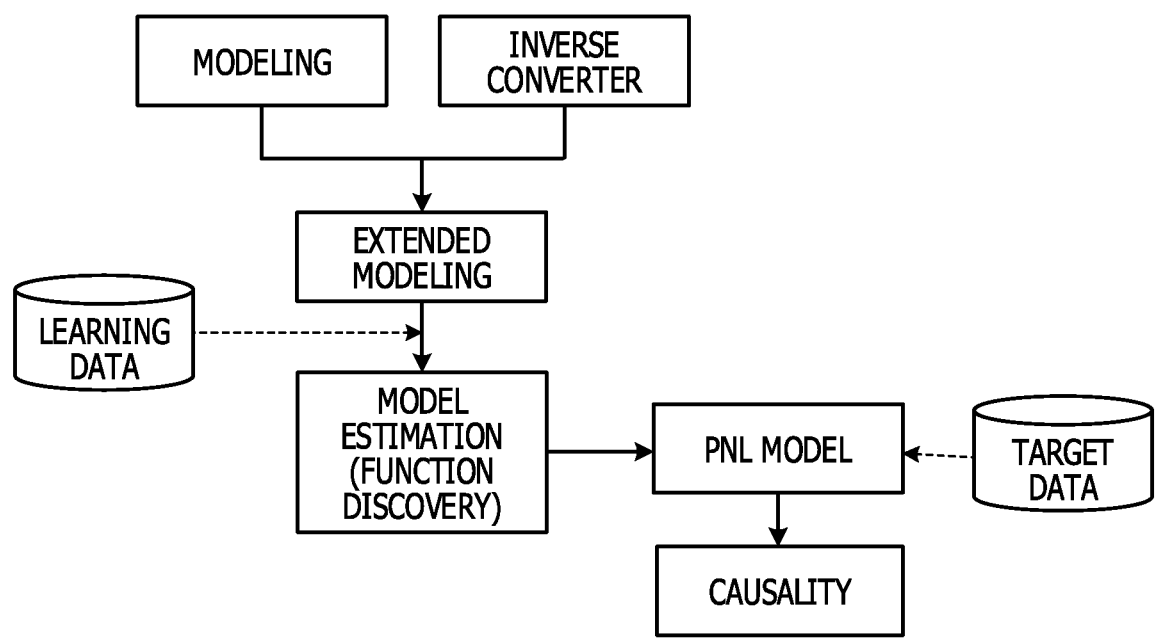
FIG. 1 is a diagram illustrating estimation of causality according to a first embodiment.

FIG. 1 is a diagram illustrating estimation of causality according to a first embodiment. An information processing apparatus described in the first embodiment is a computer apparatus that executes causal discovery between pieces of data. For example, the information processing apparatus executes model estimation (hereinafter, also referred to as function discovery or function estimation in some cases) for estimating a function to be applied to a PNL model expressing causality between pieces of data, and uses the PNL model, to which the estimated function is applied, to discover the causality between pieces of data. For example, in the causal discovery between pieces of data, the information processing apparatus estimates, by optimization, parameters that satisfy all the assumptions to be satisfied by the PNL model, and determines a causal direction in accordance with the degree of satisfaction.

Problems of the causal discovery using the PNL model, the model estimation for estimating the function to be applied to the PNL model, and common model estimation are described.

Causal Discovery

The problem of the model estimation in the common function discovery is described. First, the PNL model is described. The PNL model is a model (function) expressing causality between pieces of data. For example, when there is causality from x to y (x→y), it is assumed that an expression (1) is defined with nonlinear functions $f_1$ and $f_2$. In this case, two assumptions including: (Assumption 1) cause x and noise e are independent; and (Assumption 2) $f_2$ is an invertible function, are satisfied.

$$y = f_2(f_1(x)+e) \tag{1}$$

The causality between pieces of data is determined by using the PNL model to which the function satisfying the above assumptions is applied. For example, it is assumed that a relationship between the pieces of data (x, y) may be described by the PNL model. Then, (1) the PNL model (functions $f_1$, $f_2^{-1}$) is specifically estimated on the assumption that the causality is from x to y (x→y), and (2) the PNL model (functions $f_1$, $f_2^{-1}$) is specifically estimated on the assumption that the causality is from y to x (y→x). Thereafter, a direction out of (1) and (2) that coincides with the actual data, or a direction out of (1) and (2) in which the assumption of the PNL model is more satisfied is determined as the causal direction (causal orientation).

As described above, since a function (model) that satisfies the above-described Assumption 1 and Assumption 2 has to be used in the determination of the causal direction by the PNL model, the function that satisfies the assumptions is estimated (model estimation).

Common Model Estimation

Figure 2:
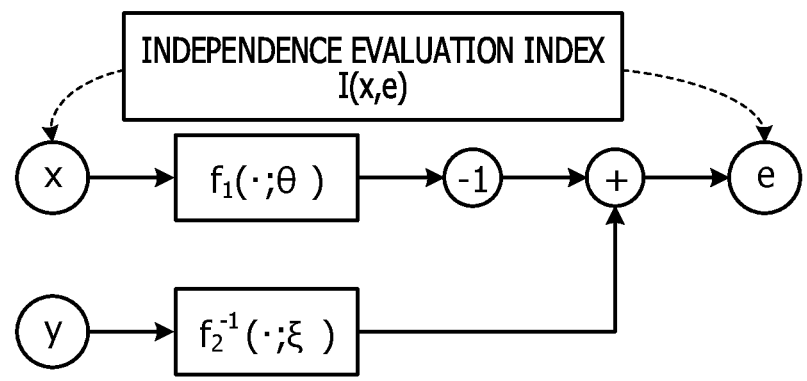
FIG. 2 is a diagram illustrating common model estimation.

Next, the common model estimation is described with reference to FIG. 2. FIG. 2 is a diagram illustrating the common model estimation. For example, model estimation that satisfies Assumption 1 of the PNL model is executed. In this case, two functions in an expression (2) of the PNL model expressed by the expression (1) are estimated. For example, the function $f_1$ and the function $f_2^{-1}$ are defined as parametric models, and parameters of the expression (2) are obtained by optimization such that Assumption 1 (cause x and noise e are independent) is satisfied. A learning model (machine learning) such as a neural network and a linear model may be used as the parametric model.

$$e = f_2^{-1}(y) - f_1(x) \tag{2}$$

For example, as illustrated in FIG. 2, an output value of a second model ($f_1$) to which a second variable (x) in the expression (2) is assigned as an input variable is subtracted from an output value of a first model ($f_2^{-1}$) to which a first variable (y) in the expression (2) is assigned. A value obtained by the subtraction is defined as an estimation value of a third variable (e). Then, the parameters of the parametric models are updated such that the independence of the second variable (x) and the estimation value of the third variable (e) is maximized.

In other words, an independence evaluation index [I(x, e)] for comparing the input data x and the noise e is optimized by an error function (objective function) expressed by an expression (3). That is, each learning model is learned such that the independence evaluation index is minimized (x and e become independent).

$$\min_{\theta, \xi} I(x, e) = I(x, f_2^{-1}(y; \xi) - f_1(x; \theta)) \tag{3}$$

When the function is estimated by the above-described method, an improper function may be obtained as the estimation result in some cases. For example, when the function $f_1$ and the function $f_2^{-1}$ become constant functions, x and e become independent, but Assumption 2 of the PNL model is not satisfied: thus, the assurance that the estimation result is the correct causality is no longer provided (Problem 1). Although there may be also an idea to make a limitation to satisfy the Assumption 2 in the modeling of the function $f_2^{-1}$, this may cause the modeling to be limited within a range not including the function to be estimated normally (Problem 2). Consequently, it is difficult to estimate the function correctly, and it is difficult to determine the causal direction correctly as well.

Problem 1 of Common Model Estimation

Next, Problem 1 is described using a specific example. As an example, there is causality from x to y (x→y), and a true relationship is expressed by the above-described expression (1), although the true relationship is unknown normally. In other words, here is described an example in which the causal direction (x→y) is determined by the model estimation.

Conditions of the functions and the variables in the expression (1) in this case are expressed by an expression (4). It is assumed that U(a, b) is a uniform distribution of a section (a, b), and that the functions and the variables conform to the PNL model. In the case of applying the expression (4), the variable x and the noise e are selected randomly from values greater than 0 and smaller than 1.

$$x \sim U(0,1), e \sim U(0,1), f_1(x) = x^2, f_2(z) = z^3 \tag{4}$$

In this case, models of $f_1$ and $f_2^{-1}$ are parameterized by neural networks (NNs), the Hilbert Schmidt independence criterion (HSIC) is used as the independence evaluation index I(x, e), and the NNs are estimated by a gradient method. That is, the learning data is used to optimize the parameters of the NNs such that the error function of the expression (3) is minimized.

First, the model estimation is executed with the causal direction assumed to be "from x to y (x→y)". For example, when the estimation result is the following [a] or [b], I(x, e)=0 (minimum value) is obtained: [a] is a case where the NNs are capable of approximating the true functions like a case where $f_1(x)$ is approximately equal to $x^2$ and $f_2^{-1}(z)$ is approximately equal to $z^{1/3}$ (x and e are independent when they are equal to the true functions); and [b] is a case where the NNs are constant functions like a case where $f_1(x)=3$ and $f_2^{-1}(z)=4$, for example (variable x and variable e become independent).

Next, the model estimation is executed with the causal direction assumed to be "from y to x (y→x)". For example, when the estimation result is the following [c], I(x, e)=0 (minimum value) is obtained: [c] is a case where the NNs are constant functions like a case where $f_1(y)=2$ and $f_2^{-1}(z)=5$, for example.

Accordingly, since the function that minimizes the independence evaluation index is found in the both causal directions, it is difficult to discern between the correct causal direction (x→y) and the wrong causal direction (y→x). Additionally, since the results of [b] and [c] do not satisfy Assumption 2 of the PNL model from the beginning, it is difficult to assure that the solution is obtained theoretically.

As described above, if the model estimation is performed only in terms of satisfying the independence of the variable x and the noise e, the constant function is obtained, and this makes it difficult to satisfy the constraint of the PNL model and determine the causality between pieces of data.

Problem 2 of Common Model Estimation

Next, Problem 2 is described under the same conditions as that of the above-described Problem 1. For example, a range of the function to be obtained is limited by imposing a constraint to the model of the function $f_2^{-1}$ in advance.

For example, a function with $f_2^{-1}$ as an inverse function is limited to a linear function $f_2^{-1}(z;a)=a*z$ in which, for example, $a \neq 0$ (a is not 0) is a parameter, and thus the eventual function satisfies Assumption 2 reliably. However, this linear function does not express the true function $f_2^{-1}(z)=z^{1/3}$. For this reason, since the independence evaluation index I(x, e) does not become 0 even if the correct causal direction (x→y) is assumed, there is the risk that whether causal direction is (x→y) or (y→x) is not determined correctly.

Method According to First Embodiment

As described above, in the common model estimation, there is the case where the constraint of the PNL model is not satisfied, and thus it is difficult to assure that whether the determined causal direction is correct. In view of this, in the first embodiment, an inverse converter is added to perform learning to obtain an inverse function, and the model estimation is executed within a range eventually including the inverse function of Assumption 2.

For example, the information processing apparatus executes modeling of the expression (2) similarly to the common method as illustrated in FIG. 2, and executes extended modeling in which the inverse converter is added to the thus-generated model. The information processing apparatus then learns the parameters such as the NNs in the extended model using the learning data and executes the model estimation.

Thereafter, the information processing apparatus applies the functions obtained by the model estimation to the PNL model. The information processing apparatus then uses the PNL model to determine causality between the target pieces of data. As a result, a proper function may be estimated and applied to the PNL model, and thus the causality between the pieces of data may be precisely determined.

Functional Configuration of Information Processing Apparatus

Figure 3:
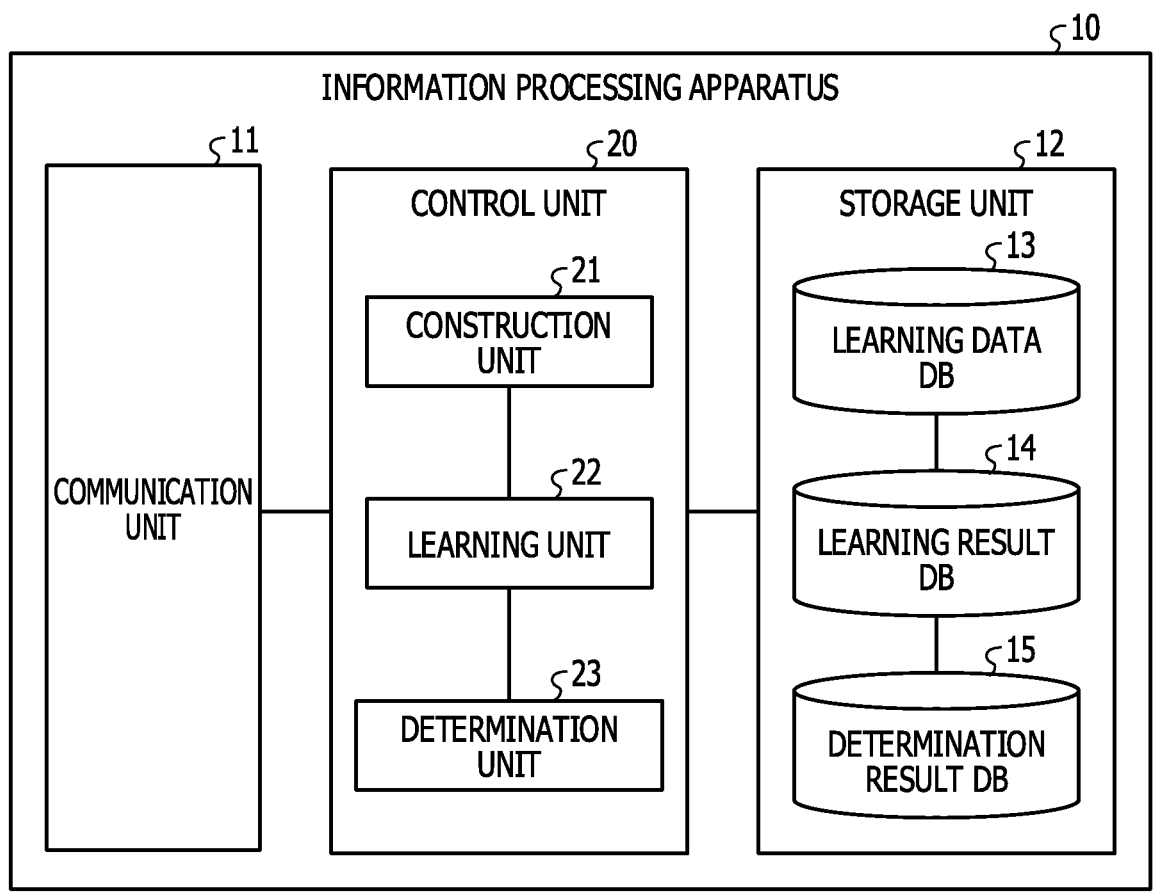
FIG. 3 is a diagram illustrating an exemplary functional configuration of an information processing apparatus according to the first embodiment.

Next, the information processing apparatus mentioned with reference to FIG. 1 is described. FIG. 3 is a diagram illustrating a functional configuration of an information processing apparatus 10 according to the first embodiment. As illustrated in FIG. 3, the information processing apparatus 10 includes a communication unit 11, a storage unit 12, and a control unit 20.

The communication unit 11 is a processing unit that controls communication with other devices and is a communication interface or the like, for example. The communication unit 11, for example, receives a processing start instruction and various kinds of data from an administrator terminal or the like, and transmits a learning result, a result of determination on causality, and the like to the administrator terminal.

The storage unit 12 is an example of a storage device that stores various kinds of data and various programs executed by the control unit 20. Examples of the storage unit 12 include a memory and a hard disk. The storage unit 12 stores a learning data database (DB) 13, a learning result DB 14, and a determination result DB 15.

The learning data DB 13 is a database that stores the learning data to be used for learning of the NNs, the linear models, and the like described later. The information to be stored herein is stored by the administrator or the like. Like the case of common machine learning, data in which input data and output data are associated to each other may be used as the learning data.

The learning result DB 14 is a database that stores the learning results of the NNs, the linear models, and the like described later. For example, the learning result DB 14 stores various parameters of the NNs and the like stored by a learning unit 22 described later. The determination result DB 15 is a database that stores the results of determination on causality between pieces of data. The information to be stored herein is stored by a determination unit 23 described later.

The control unit 20 is a processing unit that manages the entire information processing apparatus 10 and is, for example, a processor or the like. The control unit 20 includes a construction unit 21, the learning unit 22, and the determination unit 23. The construction unit 21, the learning unit 22, and the determination unit 23 are examples of electronic circuits included in the processor or examples of processes executed by the processor.

The construction unit 21 is a processing unit that constructs a model for estimating a function to be applied to the PNL model. For example, the construction unit 21 executes modeling of the expression (2) similarly to the common method and executes extended modeling of extending the thus-generated model by adding an inverse converter.

Figure 4:
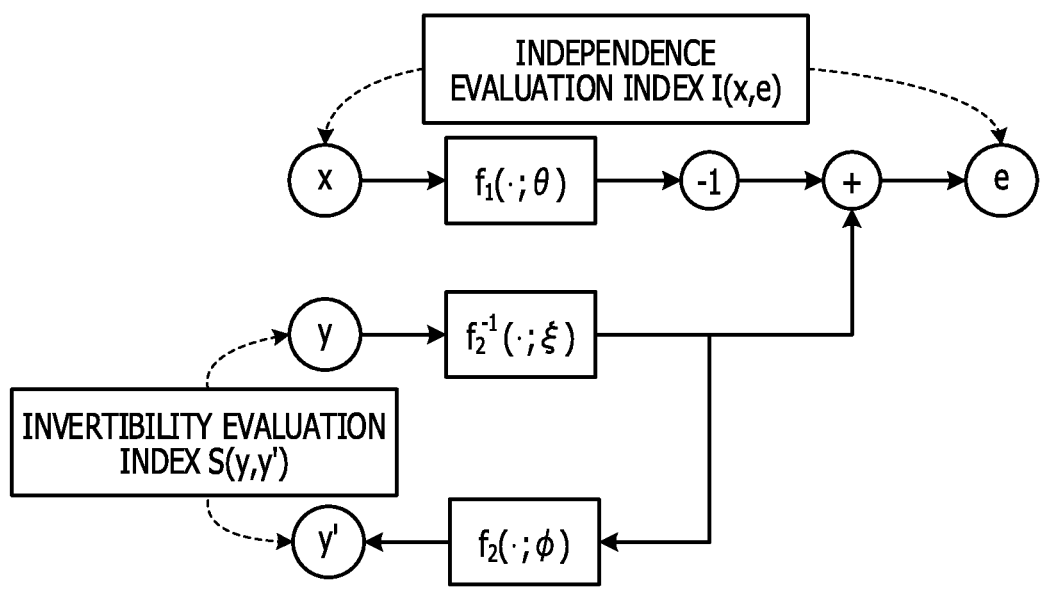
FIG. 4 is a diagram illustrating modeling used in the first embodiment.

FIG. 4 is a diagram illustrating the modeling used in first embodiment. As illustrated in FIG. 4, the construction unit 21 executes modeling of the two functions $f_1$ and $f_2^{-1}$ in the expression (2) of the PNL model by the NNs. The construction unit 21 adds an inverse converter $f_2$ for inversely converting the output of the function $f_2^{-1}$, and executes modeling of the inverse converter $f_2$ by the NN as well. $f_2$ and $f_2^{-1}$ do not have to be modeled to be inverse functions explicitly, and they are approximated to the inverse functions in the process of learning or depending on the learning result.

For example, like the example in FIG. 2, the construction unit 21 generates a model that obtains a value as the estimation value of the third variable (e) by subtracting the output value of the second model ($f_1$) to which the second variable (x) in the expression (2) is assigned as the input variable from the output value of the first model ($f_2^{-1}$) to which the first variable (y) in the expression (2) is assigned. Additionally, the construction unit 21 adds, to the model, an inverse converter that obtains an output value (y') of a third model ($f_2$), when the output value of the first model ($f_2^{-1}$), to which the first variable (y) is assigned as the input variable, is assigned as the input variable of the third model ($f_2$).

The learning unit 22 is a processing unit that performs learning of the NNs of the models constructed by the construction unit 21 by using the learning data stored in the learning data DB 13. For example, in the model illustrated in FIG. 4, the learning unit 22 performs the learning such that the independence evaluation index I(x, e) and an invertibility evaluation index S(y, y') become 0 (minimum). Here, the independence evaluation index I(x, e) is an evaluation index between the input data x to the NN (function $f_1$) and the noise e as the output data from the NN (function $f_1$), and the invertibility evaluation index S(y, y') is an evaluation index between the input data y to the NN (function $f_2^{-1}$) and the output data y' from the NN (function $f_2$) to which the output from the NN (function $f_2^{-1}$) is inputted.

For example, the learning unit 22 optimizes an error function (objective function) of an expression (5) expressed by "min [the degree that how much x and e are not independent]+λ*[the degree that how much $f_2$ is not invertible]". λ is a coefficient for balancing the degrees, which is an arbitrary value greater than 0. For example, the learning unit 22 incorporates a parameter updating based on the invertibility evaluation index S(y, y') into the process of updating the parameters of the NNs based on the independence evaluation index I(x, e) executed by the common model estimation.

$$\min_{\theta,\phi,\xi} I(x, e) + \lambda S(y, y') = \qquad (5)$$
$$I(x, f_2^{-1}(y; \xi) - f_1(x; \theta)) + \lambda S(y, f_2(f_2^{-1}(y; \xi); \phi))$$

In this case, mutual information (MI), the HSIC, and the like may be used as the independence evaluation index I(x, e). For example, the MI is effective when estimation of a probability density function is available or when the probability density function is modeled directly by the functions $f_1$ and $f_2$, and the HSIC is effective when the independence is evaluated based on data only.

As for the invertibility evaluation index S(y, y'), mean squared error (MSE) and the like may be used when the determination target is general data, and structural similarity (SSIM) may be used when the determination target is image data.

The learning unit 22 then inputs the learning data to the model illustrated in FIG. 4, executes the learning such that the expression (5) is minimized, and stores the learning result into the learning result DB 14 once the learning is terminated. The timing when the learning is terminated may be arbitrarily set to the timing when the learning using a predetermined number of learning data items is completed, the timing when the value of the expression (5) becomes a predetermined value or less, or the like.

The determination unit 23 is a processing unit that determines causality between the target pieces of data by using the PNL model. For example, the determination unit 23 reads the learning result from the learning result DB 14 and generates functions to which the parameters obtained by the learning are set. The determination unit 23 constructs the PNL model (function $f_1$, function $f_2^{-1}$) to which the generated functions are applied. Subsequently, the determination unit 23 obtains a determination result by inputting the data of the determination target to the constructed PNL model, and stores the determination result in the determination result DB 15.

For example, when the causality between the data x and the data y is determined with the definition of θ=0.01 or the like, (1) the determination unit 23 specifically estimates the PNL model (functions $f_1$, $f_2^{-1}$) on the assumption that the causality is from x to y (x→y). Subsequently, (2) the determination unit 23 specifically estimates the PNL model (functions $f_1$, $f_2^{-1}$) on the assumption that the causality is from y to x (y→x). Thereafter, the determination unit 23 determines, as the causal direction (causal orientation), a direction out of (1) and (2) in which the assumption of the PNL model is more satisfied.

For example, the determination unit 23 may display the determination results and scores (values of the expression (5)) among pieces of data. For example, the determination unit 23 may generate the determination results of the causality of data A and data B such as "data→A data B, score (0.05)" and "data→B data A, score (0.39)", and may visually display the determination results on a display or the like.

As an example of the determination on causality between pieces of data, causality between items of a blood test and a fever may be determined, and treatment corresponding to which item is effective for reducing the fever may be identified. As another example, causality between items such as the number of customers in a store, the number of cars in a parking area, and the number of coupons issued may be identified, and which item has to be executed to increase the sales may be identified.

Resolution of Problems

As described below, Problem 1 and Problem 2 that occur in the common method may be resolved by the method of the first embodiment under the same condition. In the following description, models of the functions $f_1$, $f_2$, and $f_2^{-1}$ are parameterized by the NNs, the HSIC is used as the independence evaluation index I(x, e), the MSE is used as the invertibility evaluation index S(y, y'), and the NNs are estimated by the gradient method.

First, for the data x and the data y, estimation is made on the assumption that the causal direction is from x to y (x→y). For example, when the NNs are capable of approximating the true functions like the case where $f_1(x)$ is approximately equal to $x^2$ and $f_2^{-1}(y)$ is approximately equal to $y^{1/3}$, the expression (5) may be set to 0 (minimum value). In the case of the constant function, although e is a constant and the independence evaluation index I(x, e)=0, $f_2^{-1}(y)$ is a constant and thus y'=$f_2(f_2^{-1}(y))$≠y, which means that it is difficult to achieve the invertibility evaluation index S(y, y')=0. Thus, by using the method of the first embodiment, Assumption 1 may be satisfied while excluding the constant function.

Next, for the data x and the data y, estimation is made on the assumption that the causal direction is from y to x (y→x). In this case, since there is a residual, it is difficult to generate functions that satisfy the error function of the expression (5) "I (x, y)+λS(y, y')"=0.

Since the learning is performed such that the function $f_2$ and the function $f_2^{-1}$ become the inverse function to each other by using the method of the first embodiment, Assumption 2 is satisfied. Consequently, by using the method of the first embodiment, Assumption 1 and Assumption 2 may be satisfied and a proper model (function) may be estimates and applied to the PNL model. Thus, for the data x and the data y, the determination that the causal direction is from x to y (x→y) may be correctly made.

Processing Flow

Figure 5:
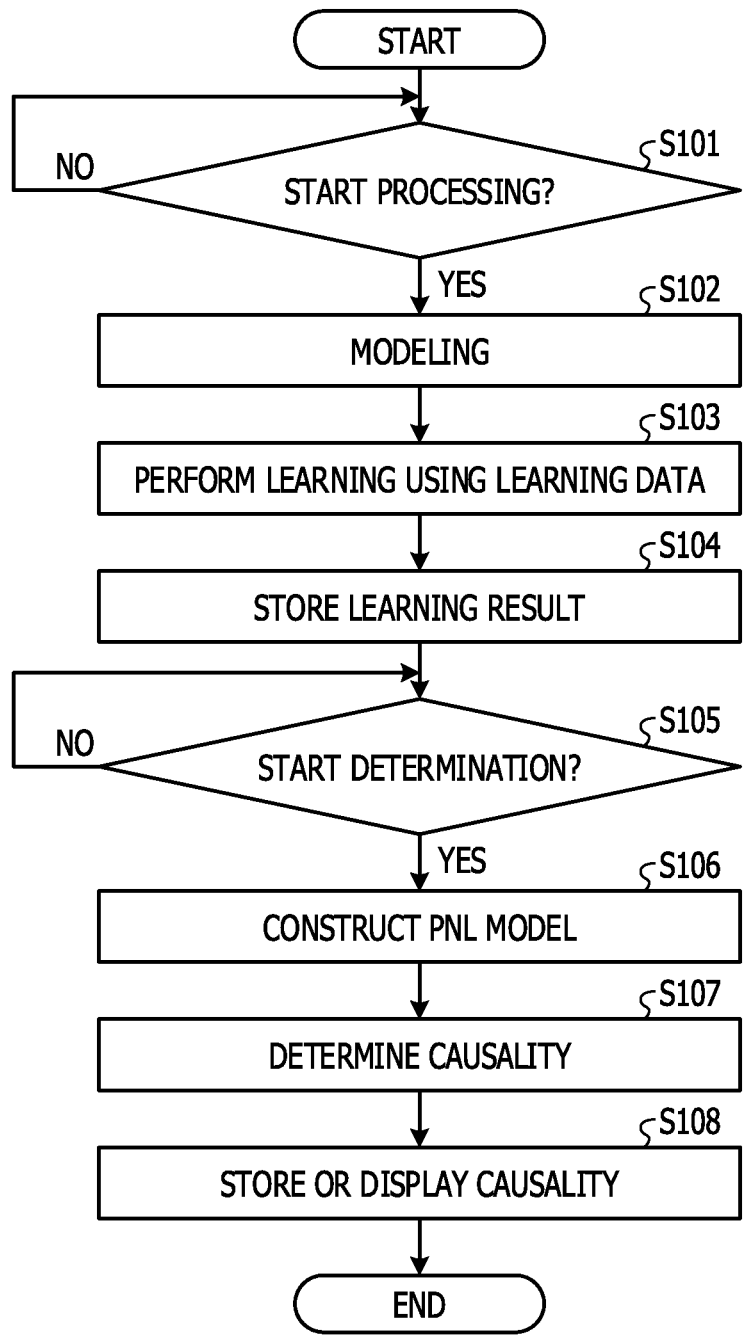
FIG. 5 is a flowchart illustrating a flow of processing according to the first embodiment.

FIG. 5 is a flowchart illustrating a flow of processing according to the first embodiment. Although here is described a sequential flow in which the learning processing is followed by the processing of determining causality, it is not limited thereto, and the processing may be executed in different timings.

As illustrated in FIG. 5, once the start of the processing is instructed (S101: Yes), the construction unit 21 executes modeling of the two functions $f_1$ and $f_2^{-1}$ in the expression (2) of the PNL model by the NNs, and executes modeling in which the inverse converter $f_2$ for inversely converting the output of the function $f_2^{-1}$ is added (S102).

Subsequently, the learning unit 22 performs learning of the NNs in the constructed model using the learning data such that the error is minimized (S103), and once the learning is completed, the learning unit 22 stores the learning result in the learning result DB 14 (S104).

Thereafter, the determination unit 23 obtains the data of the determination target, and once the start of the determination processing is instructed (S105: Yes), the determination unit 23 constructs the PNL model to which the function using the learning result is applied (S106).

Then, the determination unit 23 determines (estimates) the causality between pieces of the determination target data using the constructed PNL model (S107), and the determination unit 23 stores the thus-determined causality in the determination result DB 15 or displays the thus-determined causality on a display unit such as the display or the like (S108).

Effects

As described above, when the causal discovery is performed based on the data by assuming the PNL model, the information processing apparatus 10 may estimate the functions that satisfy the assumption of existence of the inverse function by also learning the inverse converter at the same time. Thus, the information processing apparatus 10 may quantify the degree of existence of the inverse function and may precisely estimate the functions. Consequently, the information processing apparatus 10 may determine the causality between pieces of data based on the data by assuming the PNL model to determine the causal direction between the pieces of data.

Other Embodiments

Although the first embodiment has been described, the present disclosure may be implemented in various different forms.

Data, Numerical Values, and the Like

The data examples, the numerical value examples, the display examples, and so on used in the first embodiment are merely examples and may be arbitrarily changed. The input data, the learning method, and so on are also merely examples and may be arbitrarily changed.

The NNs, the linear models, and so on may be employed for the modeling of the functions $f_1$, $f_2$, and $f_2^{-1}$. The NNs are effective when a strong nonlinear relationship and the like is known in advance. Since the degrees of freedom regarding a function that may be approximated is high, the NNs may estimate a complicated relationship. The linear models are effective for first easy testing on unknown data. Since the optimization (learning) is easy, the speed of the learning processing may be increased.

Examples of Learning Data

Examples of pieces of data from various fields that may be employed as the above-described learning data are described; however, note that they are merely an example and the data is not limited thereto. In this case, an example in which it is assumed that the causality is from x to y (x→y) is described.

For example, in the case of medical field, the learning data may be data in which the condition of a disease is x, an examination item such as a body temperature is y, and noise of a measurement equipment is e. In the economic field, the learning data may be data in which the percentage of customers who have a point card is x, the sales of a store is y, and another causal factor such as weather is e. In the material field, the learning data may be data in which a molecular structure is x, the material strength is y, and noise of a measurement equipment is e. In the manufacturing field, the learning data may be data in which a manufacturing temperature is x, the quality of a product is y, and noise of a measurement equipment is e.

System

Processing procedures, control procedures, specific names, and information including various kinds of data and parameters indicated in the specification and the drawings may be changed arbitrarily unless otherwise specified.

The constituent elements of the devices illustrated in the drawings are functional conceptual ones and not necessarily configured physically as illustrated in the drawings. For example, specific forms of distribution and integration of the devices are not limited to those illustrated in the drawings. For example, all or some of the devices may be functionally or physically distributed or integrated in any unit based on various loads, usage statuses, or the like.

All or an arbitrary part of the processing functions performed by the devices may be implemented by a central processing unit (CPU) and a program analyzed and executed by the CPU or may be implemented by a hardware device using wired logic coupling.

Hardware

Figure 6:
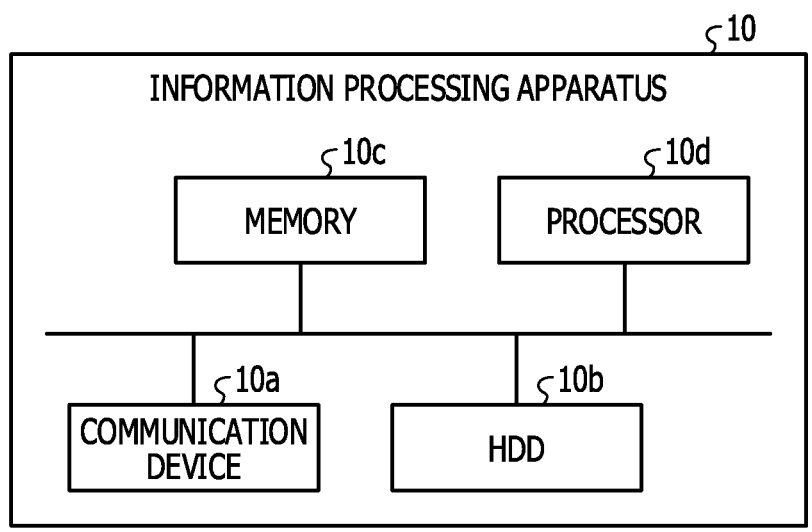
FIG. 6 is a diagram illustrating an exemplary hardware configuration of the information processing apparatus according to the first embodiment.

FIG. 6 is a diagram illustrating an exemplary hardware configuration. As illustrated in FIG. 6, the information processing apparatus 10 includes a communication device 10a, a hard disk drive (HDD) 10b, a memory 10c, and a processor 10d. The components illustrated in FIG. 6 are coupled to each other by a bus or the like.

The communication device 10a is a network interface card or the like that communicates with a server. The HDD 10b stores a program and DBs that implement the functions illustrated in FIG. 3.

The processor 10d executes processes that implement the functions illustrated in FIG. 3 and the like by reading from the HDD 10b or the like the program that implements processing identical to that of the processing units illustrated in FIG. 3 and loading the program into the memory 10c. For example, the processes perform the same functions as that of the processing units included in the information processing apparatus 10. For example, the processor 10d reads, from the HDD 10b or the like, the program having the same functions as the construction unit 21, the learning unit 22, the determination unit 23, and the like. Then, the processor 10d executes the processes that perform the same processing as that of the construction unit 21, the learning unit 22, the determination unit 23, and the like.

As described above, the information processing apparatus 10 functions as an information processing apparatus that implements the discovery method by reading and executing the program. The information processing apparatus 10 may also perform the same functions as that of the first embodiment by reading the program from a recording medium with the use of a medium reading device and by executing the read program. The program described in the other embodiments is not limited to a program that is executed by the information processing apparatus 10. For example, the present disclosure may be applied similarly to the case where another computer or a server executes the program or the case where the other computer and the server cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   obtaining an estimation value of a third variable by subtracting a second output value of a second parametric model to which a second variable is assigned as an input variable from a first output value of a first parametric model to which a first variable is assigned as an input variable;
   performing first parameter update of updating first parameters of the first parametric model and second parameters of the second parametric model such that independence between the second variable and the estimation value of the third variable is maximized; and
   performing second parameter update of updating the first parameters and third parameters of a third parametric model in the first parameter update, such that a third output value of the third parametric model is approximated to the first variable, the third parametric model being assigned with the first output value as an input variable.

2. The non-transitory computer-readable recording medium according to claim 1, the process further comprising:
   incorporating the second parameter update into the first parameter update to update the first parameters, the second parameters, and the third parameters concurrently.

3. The non-transitory computer-readable recording medium according to claim 1, the process further comprising:
   constructing, when causality between first data and second data is to be determined, a post-nonlinear (PNL) model by using the first parametric model in which the first parameters are already updated and the second parametric model in which the second parameters are already updated; and
   determining the causality between the first data and the second data based on a result obtained by inputting the first data and the second data to the PNL model.

4. The non-transitory computer-readable recording medium according to claim 1, the process further comprising:
   updating the first parameters and the second parameters such that a first error between the second variable and the estimation value of the third variable is minimized; and
   updating the first parameters and the third parameters such that a second error between the third output value and the first variable is minimized.

5. The non-transitory computer-readable recording medium according to claim 4, the process further comprising:
   generating each of the first parametric model, the second parametric model, and the third parametric model by using a neural network or a linear model;
   performing first learning of learning parameters of the neural network or the linear model such that the first error is minimized by using learning data prepared in advance; and
   performing second learning of learning the parameters of the neural network or the linear model such that the second error is minimized by using the learning data.

6. The non-transitory computer-readable recording medium according to claim 5, the process further comprising:
   performing the first learning such that the first error is minimized by using mutual information or Hilbert Schmidt independence criterion (HSIC); and
   performing the second learning such that the second error is minimized by using mean squared error.

7. The non-transitory computer-readable recording medium according to claim 6, the process further comprising:
   constructing, when causality between first data and second data is to be determined, a post-nonlinear (PNL) model by using the first parametric model in which the first learning and the second learning is already performed and the second parametric model in which the first learning is already performed; and
   determining the causality between the first data and the second data based on a result obtained by inputting the first data and the second data to the PNL model.

8. A method of updating parameters, the method comprising:
   obtaining, by a computer, an estimation value of a third variable by subtracting a second output value of a second parametric model to which a second variable is assigned as an input variable from a first output value of a first parametric model to which a first variable is assigned as an input variable;
   performing first parameter update of updating first parameters of the first parametric model and second parameters of the second parametric model such that independence between the second variable and the estimation value of the third variable is maximized; and
   performing second parameter update of updating the first parameters and third parameters of a third parametric model in the first parameter update, such that a third output value of the third parametric model is approximated to the first variable, the third parametric model being assigned with the first output value as an input variable.

9. An information processing apparatus, comprising:
   a memory; and
   a processor coupled to the memory and the processor configured to:
   obtain an estimation value of a third variable by subtracting a second output value of a second parametric model to which a second variable is assigned as an input variable from a first output value of a first parametric model to which a first variable is assigned as an input variable;
   perform first parameter update of updating first parameters of the first parametric model and second parameters of the second parametric model such that independence between the second variable and the estimation value of the third variable is maximized; and
   perform second parameter update of updating the first parameters and third parameters of a third parametric model in the first parameter update, such that a third output value of the third parametric model is approximated to the first variable, the third parametric model being assigned with the first output value as an input variable.

* * * * *